United States Patent
Waldestrand et al.

(10) Patent No.: US 11,731,320 B2
(45) Date of Patent: Aug. 22, 2023

(54) TOOL ASSEMBLY FOR MANUFACTURING PARTS AND A METHOD OF PRODUCING A TOOLING ASSEMBLY

(71) Applicant: Essentium, Inc., Pflugerville, TX (US)

(72) Inventors: Iris Gisey Euan Waldestrand, Puebla (MX); Kevin Michael Holder, Houston, TX (US); Bryan Scott Zahner, Pflugerville, TX (US); Alexander Stockton, Austin, TX (US); Elisa Marina Teipel, Pflugerville, TX (US); Blake Ryland Teipel, Pflugerville, TX (US)

(73) Assignee: ESSENTIUM IPCO, LLC, Pflugerville, TX (US)

( * ) Notice: Subject to any disclaimer, the term of this patent is extended or adjusted under 35 U.S.C. 154(b) by 322 days.

(21) Appl. No.: 16/766,533

(22) PCT Filed: Nov. 27, 2018

(86) PCT No.: PCT/US2018/062605
§ 371 (c)(1),
(2) Date: May 22, 2020

(87) PCT Pub. No.: WO2019/104320
PCT Pub. Date: May 31, 2019

(65) Prior Publication Data
US 2021/0370552 A1 Dec. 2, 2021

Related U.S. Application Data

(60) Provisional application No. 62/591,015, filed on Nov. 27, 2017.

(51) Int. Cl.
*B29C 33/04* (2006.01)
*B29C 33/38* (2006.01)
(Continued)

(52) U.S. Cl.
CPC .......... *B29C 33/04* (2013.01); *B29C 33/3835* (2013.01); *B29C 33/3842* (2013.01);
(Continued)

(58) Field of Classification Search
CPC .......... B29C 45/72; B29C 45/73; B29C 33/04; B29C 49/4823; B29C 35/007
See application file for complete search history.

(56) References Cited

U.S. PATENT DOCUMENTS 5,062,786 A 11/1991 Arai
5,562,846 A 10/1996 McKeen
(Continued)

FOREIGN PATENT DOCUMENTS

JP H10175218 A 6/1998
JP H11348045 A 12/1999
(Continued)

OTHER PUBLICATIONS

Knights, Mikell, CAD Evolution for 3D Mold Design, Plastic Technology, https://www.potonline.com/articles/cad-evolution-for-3d-mold-design, 8 pages. (Year: 2008).*
(Continued)

*Primary Examiner* — Emmanuel S Luk
(74) *Attorney, Agent, or Firm* — Vivacqua Crane, PLLC

(57) ABSTRACT

A mold assembly for use in manufacturing parts includes a first and second mold halves and a mold temperature control system. The first mold half comprises at least a first mold cavity and a first coolant passage. The second mold half comprising at least a second mold cavity and a second coolant passage. The mold temperature control system is in fluid communication with the first and second coolant passages of the first and second mold half. The mold temperature control system comprises a fluid, a means to control the temperature of the fluid, and a pump to circulate the fluid
(Continued)

Figure 1:
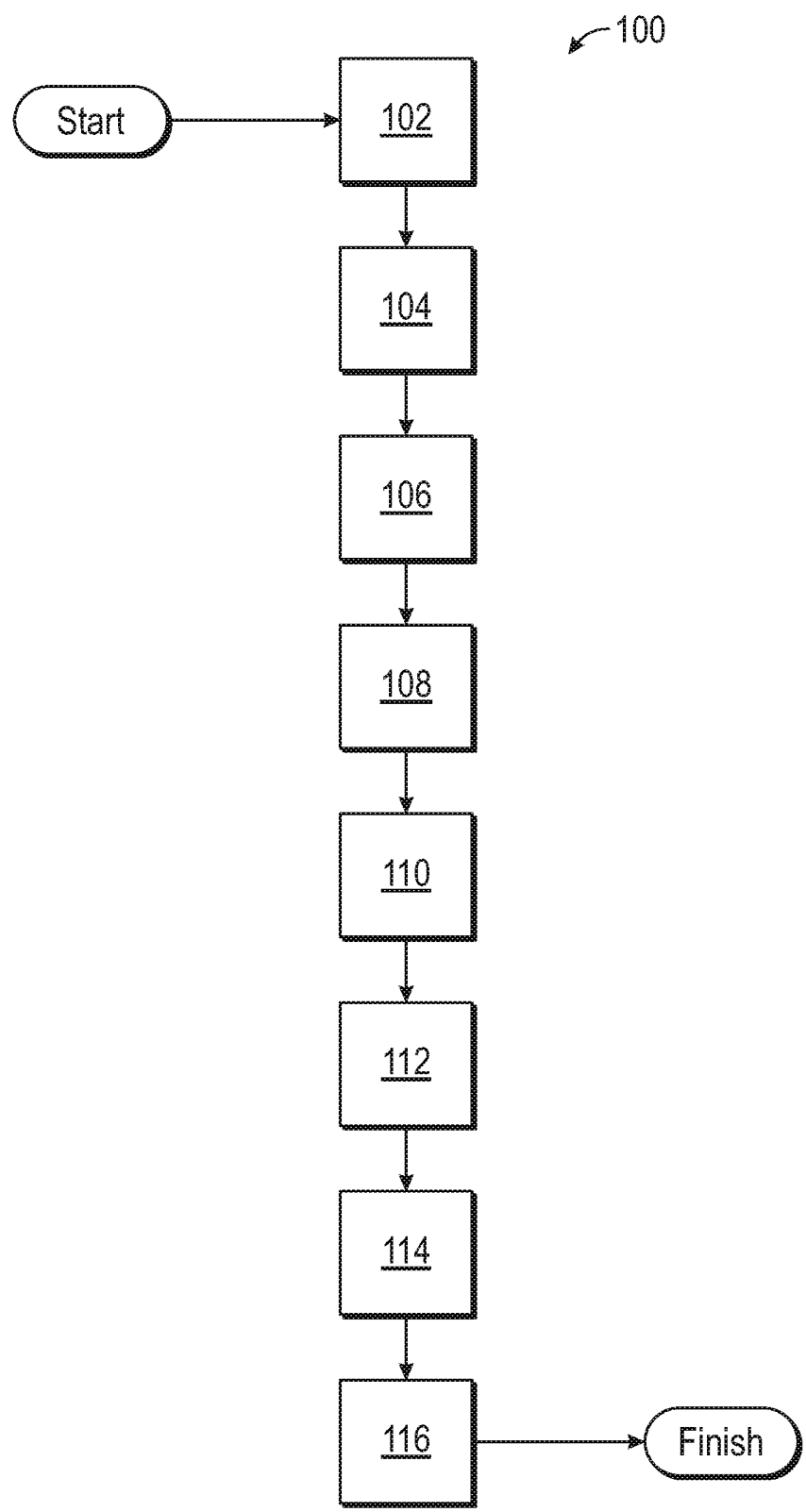

through the mold temperature control system and the first and second coolant passages.

20 Claims, 3 Drawing Sheets

(51) Int. Cl.
*B33Y 10/00* (2015.01)
*B33Y 80/00* (2015.01)
*B33Y 50/00* (2015.01)
*B29C 64/118* (2017.01)
*B29C 37/00* (2006.01)
*B29L 31/00* (2006.01)

(52) U.S. Cl.
CPC .............. *B33Y 10/00* (2014.12); *B33Y 50/00* (2014.12); *B33Y 80/00* (2014.12); *B29C 64/118* (2017.08); *B29C 2037/90* (2013.01); *B29L 2031/757* (2013.01)

(56) References Cited

U.S. PATENT DOCUMENTS

| | | | | |
|---|---|---|---|---|
| 5,641,448 | A | * | 6/1997 | Yeung ................... B29C 64/135 264/129 |
| 5,775,402 | A | | 7/1998 | Sachs et al. |
| 5,942,168 | A | | 8/1999 | Ichikawa et al. |
| 6,039,556 | A | * | 3/2000 | Jens ....................... B29C 33/301 425/363 |
| 6,533,981 | B1 | * | 3/2003 | Jens .......................... F28F 5/02 29/466 |
| 8,105,529 | B1 | | 1/2012 | Hendry |
| 8,108,982 | B2 | * | 2/2012 | Manuel ................... B29C 33/04 29/527.3 |
| 8,678,802 | B2 | * | 3/2014 | Jenko .................. B29C 45/2725 425/572 |
| 10,675,789 | B2 | * | 6/2020 | Dikovsky ............... B29C 33/40 |
| 10,759,090 | B2 | * | 9/2020 | Gunner ............... B29C 33/3842 |
| 2002/0041058 | A1 | | 4/2002 | Murphy |
| 2004/0038074 | A1 | * | 2/2004 | Manuel ................. B23P 15/246 428/677 |
| 2004/0247725 | A1 | * | 12/2004 | Lang ..................... B29C 33/302 425/406 |
| 2006/0055085 | A1 | * | 3/2006 | Nakagawa ............ B29C 33/301 264/328.16 |
| 2006/0196957 | A1 | | 9/2006 | Johnson |
| 2008/0145472 | A1 | * | 6/2008 | Oikawa ................... B29C 33/56 425/567 |
| 2012/0070526 | A1 | | 3/2012 | Hinzpeter |
| 2012/0315351 | A1 | * | 12/2012 | Oh .......................... B29C 45/73 425/552 |
| 2013/0017468 | A1 | | 1/2013 | Kim et al. |
| 2013/0220572 | A1 | | 8/2013 | Rocco et al. |
| 2016/0023375 | A1 | * | 1/2016 | Uram ................ C04B 35/63436 501/153 |
| 2016/0100917 | A1 | * | 4/2016 | Howe ................. A61C 13/0004 264/16 |
| 2016/0107396 | A1 | * | 4/2016 | Berman ................... B25J 11/00 425/510 |
| 2017/0043518 | A1 | | 2/2017 | Narayanaswamy |
| 2017/0182680 | A1 | | 6/2017 | England |
| 2017/0217090 | A1 | | 8/2017 | Endoh et al. |
| 2018/0147752 | A1 | * | 5/2018 | Nürnberg ................ B29C 41/06 |
| 2018/0243948 | A1 | | 8/2018 | Matzner et al. |

FOREIGN PATENT DOCUMENTS

| | | |
|---|---|---|
| JP | 2003094440 A | 4/2003 |
| JP | 2007268999 A | 10/2007 |
| JP | 2016172401 A | 9/2016 |
| WO | 2014146056 A1 | 9/2014 |
| WO | WO2016124432 A1 | 8/2016 |
| WO | 2017037713 A1 | 3/2017 |
| WO | 2018222481 A1 | 12/2018 |

OTHER PUBLICATIONS

Search Report in SG11202004522R, Intellectual Property Office of Singapore, dated Feb. 16, 2021.
International Search Report and Written Opinion in PCT/US2018/062605, International Searching Authority WIPO, dated Mar. 5, 2019.
International Preliminary Report on Patentability in PCT/US2018/062605, International Preliminary Examining Authority WIPO, dated Feb. 21, 2020.
Hopkinson N. et al., Conformal Cooling and Heating Channels using Laser Sintered Tools. 2000 International Solid Freeform Fabrication Symposium, Jan. 31, 2000.
Bayer Materials Science, Engineering Polymers—A Design Guide Part and Mold Design: Thermoplastics, Dec. 30, 2000.
European Patent Office, Extended European Search Report in European App. No. 18882246.4 / PCT/US2018/062605, dated Nov. 11, 2021.
The 3D Printing Solutions Company, Comparison of Sealing Methods for FDM Materials, Technical Applications Guide, Dec. 31, 2014.
Partial Supplementary European Search Report in 18882246.4 European Patent Office, dated Jul. 29, 2021.
Second Written Opinion in SG11202004522R, Intellectual Property Office of Singapore, dated Sep. 29, 2021.
Notice of the First Office Action in Chinese Application No. 2018800767274, Chinese National Intellectual Property Administration, dated Sep. 6, 2021.
Mireles, Jorge, et al., Analysis of Sealing Methods for FDM-fabricated Parts, Semantic Scholar, pp. 185-195 (Jan. 31, 2011).
Leak Plugging Workers with Temperature and Pressure, General Administration of Quality Supervision, Inspection and Quarantine, Quality and Technical Supervision Industry Occupational Skills Appraisal Guidance Center Group, p. 118, China Metrology Press (Nov. 30, 2010).
3D Printing Technology, Thirteenth Five-Year Plan for National Colleges and Universities, Li Bo, p. 1-2, China Light Industry Press (Aug. 31, 2017).
Japanese Office Action in Application No. 2020-546304, Japanese Patent Office, dated Aug. 22, 2022, pp. 1-5.
Notice of Reason for Rejection in Corresponding Korean App. No. KR10-2020-7017142, Korean Intellectual Property Office, dated Nov. 1, 2022.
The Past, Present and Future of Additive Manufacturing, Institute of Packaging Professionals, Central Ohio Chapter, May 13, 2021, United States.
The Ultimate Guide to Stereolithography (SLA) 3D Printing, Mar. 2017, formlabs.com, United States.
Validating Isotropy in SLA 3D Printing, https://www.formlabs.com/blog/isotropy-in-SLA-3D-printing/, Oct. 12, 2016, United States.

* cited by examiner

TOOL ASSEMBLY FOR MANUFACTURING PARTS AND A METHOD OF PRODUCING A TOOLING ASSEMBLY

CROSS REFERENCE TO RELATED APPLICATION

This application is the National Stage of International Application No. PCT/US2018/062605, filed Nov. 27, 2018 and claims the benefit U.S. Provisional Patent Application Ser. No. 62/591,015, filed Nov. 27, 2017, the disclosures of which are hereby incorporated in its entirety herein by reference.

FIELD

The present disclosure relates to molding for the manufacture of parts, and more specifically to a method of producing a mold assembly for manufacturing parts using a variety of processes.

BACKGROUND

The statements in this section merely provide background information related to the present disclosure and may or may not constitute prior art.

Equipment manufactures are constantly searching for new ways to improve product cycle time and shortening the product design process. When providing the best quality products for complicated assemblies having thousands of parts, multiple iterations of prototype or preproduction builds are required.

In producing production level parts such as metal stampings or injection molded plastic parts, production level molding and molds are expensive and have very long build times. Thus, production level molding and molds are not a viable option when producing prototype or preproduction level parts. Therefore, preproduction molding is beneficial for producing a limited number of parts having nearly the same functionality. However, preproduction molding still has long lead times that further prevent the acceleration of the preproduction process. Furthermore, although less expensive than production molding, preproduction molding is still expensive further applying pressure to the ability of reducing the cost of the equipment manufacturing process.

While current preproduction molding and molds have a variety of uses and performance capabilities, they fail to further improve parts production efficiency, costs, and product utility. Thus, while the current molding, molds and processes are useful for their intended purpose, there is room in the art for an improved molding, molds, and manufacturing processes that provides improved investment cost, build time, design flexibility, and quality.

SUMMARY

This disclosure describes an invention allowing the fabrication of molds using additive manufacturing with high performance plastic filament. Molds are created using CAD (Computer-aided design), and when necessary, cooling channels are strategically designed according to the model of the piece and the print orientation. Molds are 3D printed using FDM (Fused Deposition Modeling) out of thermoplastic materials. Then the 3D printed mold may include post-processing such as CNC machining when necessary to achieve GD&T (Geometric Dimensioning and Tolerance) standards according to the application. If cooling channels are included a liquid sealant at high pressure is infused and cured to ensure liquid tight cooling channels at elevated pressures. The invention can be used for a variety of manufacturing applications including: stamping, foaming, injection molding, compression molding, resin transfer molding (and vacuum assisted), thermoforming, vacuum forming, investment casting, spin casting, and blow molding. The nature of manufacturing and design changes will benefit from the rapid iteration afforded by this invention at lower costs to traditional methods.

This invention has a high turn-around rate, being produced in 1-2 weeks with much lower cost than traditional metal molding. This invention is also relevant to a variety of manufacturing industries by supporting most molding/molding methods including stamping, foaming, injection molding, compression molding, resin transfer molding/vacuum assisted resin transfer molding, specifically for thermoset resins and filling preforms, transfer molding of solids wouldn't work because mold has to be hot, thermoforming/vacuum forming, investment casting (as the preform sacrificial layer), spin casting, and blow molding.

The invention allows high design flexibility and by combining additive and subtractive manufacturing (when required), molds will be produced faster and cheaper than using conventional metal mold fabrication processes, this results in affordable molds for low part quantities, design iterations, prototyping and creation of new models for product evolution and innovation.

Invention is based on DFM (Design for Manufacturing) methods, this ensures total compatibility with additive manufacturing fabrication, as well as ease of assembly with the hardware that will form part of the mold for its incorporation into the injection molding machine, or other mold forming machines.

The invention can be adjusted to match any commercial molding machine hardware.

The invention is compatible with pressurized coolant systems and it is suitable to be used in industrial machines.

The invention is made from high temperature thermoplastic composite materials using additive manufacturing. This is a key benefit to this invention because thermoplastics are cheaper and easier to work with than metals. This also allows for easy replication.

The invention is first designed in a computer aided design (CAD) software to create a model. The model can be designed with or without cooling channels depending on the molding purpose.

Once the model is complete, it is imported into a slicing software used to generate the FDM printing path with specific print settings according to the material, including print temperature, print speed, print extrusion, layer height and width. This is referred to as the G-code which is transferred to a printer capable of printing the volume of the part. Depending on the material used, the printer must have a heated bed and a heated build volume.

Upon completion, the print is removed from the printer. Post-processing steps are involved to complete the invention. Sacrificial (support/base/brim/skirt/raft) material is first removed by computer numerical control (CNC) machine. If any cooling channels are designed into the mold, the entry and exit ports are cleaned and tapped to allow threading of coolant connectors and hosing. Polymer extrusion 3D printing consists of many layers and is generally not moisture resistant, as layers can absorb moisture, form voids between layers and leak coolant, resulting in mold failure from overheating. We have developed a process that infuses into the 3D printed part and creates a mold that can withstand pressurized coolant without leaking.

The process to infuse the mold requires a flowable material that can fill the coolant channels. Once full, the fluid is pressurized inside the mold between 60-100 psi for at least 60 seconds. After this infusion step, any residual fluid is removed from the mold by blowing air through the mold channels to ensure no ports are clogged with residual fluid. The flowable material is now set by a curing process. Note if a cooling channel is not needed, our invention would tap a small whole in the side of the mold and fill with the flowable material for added support and functionality.

An additional option for sealing the mold is electroplating and polishing. This can be completed by using an electroplating compatible thermoplastic material or by using a multi-step process that will allow electroplating of the outer mold surface. This step would be on the surface and an additional buffing step, that could help achieved class A finish. It would provide both the class A surface needed for automotive and other industries as well as mechanical property enhancement.

Once the sealing process is complete, the mold is ready for use. Materials that can be used for the infusion/sealing process High flow, high temperature stability two-part epoxy, ceramic (flowable), and electroplating.

The present disclosure provides a mold assembly for use in manufacturing parts. The mold assembly includes a first and second mold halves and a mold temperature control system. The first mold half comprises at least a first mold cavity and a first coolant passage. The second mold half comprising at least a second mold cavity and a second coolant passage. The mold temperature control system is in fluid communication with the first and second coolant passages of the first and second mold half. The mold temperature control system comprises a fluid, a means to control the temperature of the fluid, and a pump to circulate the fluid through the mold temperature control system and the first and second coolant passages.

In one example of the present disclosure, the mold assembly further comprises a sealant infused and cured on a first surface of the first mold cavity and on a second surface of the second mold cavity.

In another example of the present disclosure, the mold assembly further comprises a sealant infused and cured on a third surface of the first coolant passage and a fourth surface of the second coolant passage.

In yet another example of the present disclosure, the first and second coolant passages each comprise a first cross-section and a second cross-section, and wherein the first cross-section has a different dimension and shape as the second cross-section.

In yet another example of the present disclosure, the sealant comprises one of a two-part, high temperature epoxy and a flowable ceramic.

In yet another example of the present disclosure, the first surface of the first mold cavity and the second surface of the second mold cavity comprises a deposited metal.

The present disclosure also provides a method of manufacturing a mold assembly. The method comprises creating a first computer aided design (CAD) model of a surface of a mold assembly, and wherein the surface comprises a final shape of a molded product. A feature is added to the first CAD model of the surface to create a second CAD model of the mold assembly. The second CAD model is converted to a printing path file for use by a three dimensional printer. The printing path file is used to print a solid model of the second CAD model.

In one example of the present disclosure, the method further comprises removing excess material from the solid model.

In another example of the present disclosure, the method further comprises converting the second CAD model to a tool cutting path and machining the solid model.

In yet another example of the present disclosure, the method further comprises infusing a machined surface of the solid model with a sealant.

In yet another example of the present disclosure, the feature of the first CAD model comprises at least one of a parting surface, a coolant passage, an ejection pin hole, a vent hole, and an injection passage.

In yet another example of the present disclosure, infusing the machined surface of the solid model with the sealant further comprises infusing the machined surface and the coolant passage with the sealant and pressurizing the coolant passage between about 60 PSI and 100 PSI for 30 seconds.

In yet another example of the present disclosure, infusing the machined surface of the solid model with the sealant further comprises infusing the machined surface and the coolant passage with the sealant comprising one of a high flow, high temperature two-part epoxy and a flowable ceramic and pressurizing the coolant passage between about 60 PSI and 100 PSI for 30 seconds.

In yet another example of the present disclosure, the method further comprises one of electroplating, polishing, and machining the surface of the mold assembly.

The present disclosure also provides another method of manufacturing a mold assembly. The method comprises creating a first computer aided design (CAD) model of a surface of a mold assembly, and wherein the surface comprises a final shape of a molded product. A feature is added to the first CAD model of the surface to create a second CAD model of the mold assembly. The feature includes one of a parting surface, a coolant passage, an ejection pin hole, a vent hole, and an injection passage. The second CAD model is converted to a printing path file for use by a three dimensional printer. The printing path file is used to print a solid model of the second CAD model.

In one example of the present disclosure, the method further comprises removing excess material from the solid model.

In another example of the present disclosure, the method further comprises converting the second CAD model to a tool cutting path and machining the solid model.

In yet another example of the present disclosure, the method further comprises infusing a machined surface of the solid model with a sealant.

In yet another example of the present disclosure, infusing the machined surface of the solid model with the sealant further comprises infusing the machined surface and the coolant passage with the sealant and pressurizing the coolant passage between about 60 PSI and 100 PSI for 30 seconds.

In yet another example of the present disclosure, infusing the machined surface of the solid model with the sealant further comprises infusing the machined surface and the coolant passage with the sealant comprising one of a high flow, high temperature two-part epoxy and a flowable ceramic and pressurizing the coolant passage between about 60 PSI and 100 PSI for 30 seconds.

In yet another example of the present disclosure, the method further comprises one of electroplating, polishing, and machining the surface of the mold assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
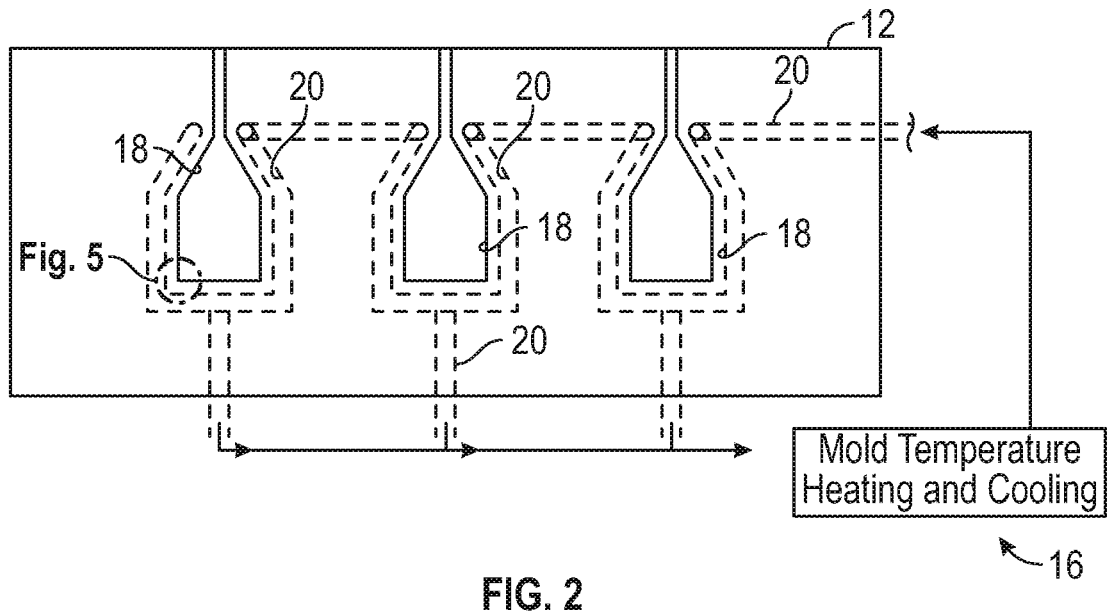
Figure 3:
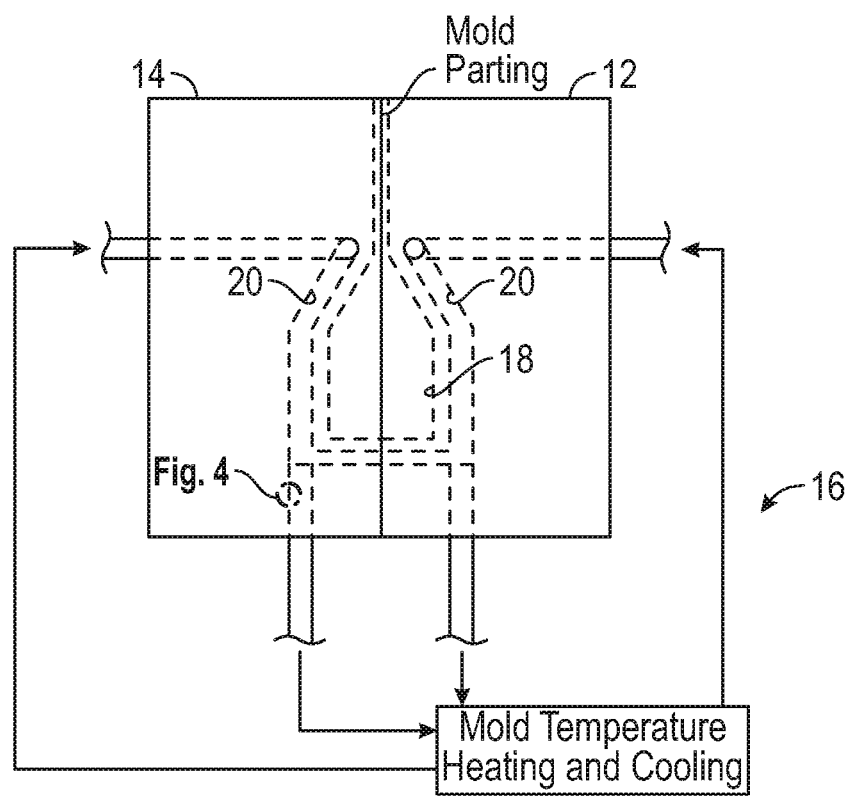
Figure 4:
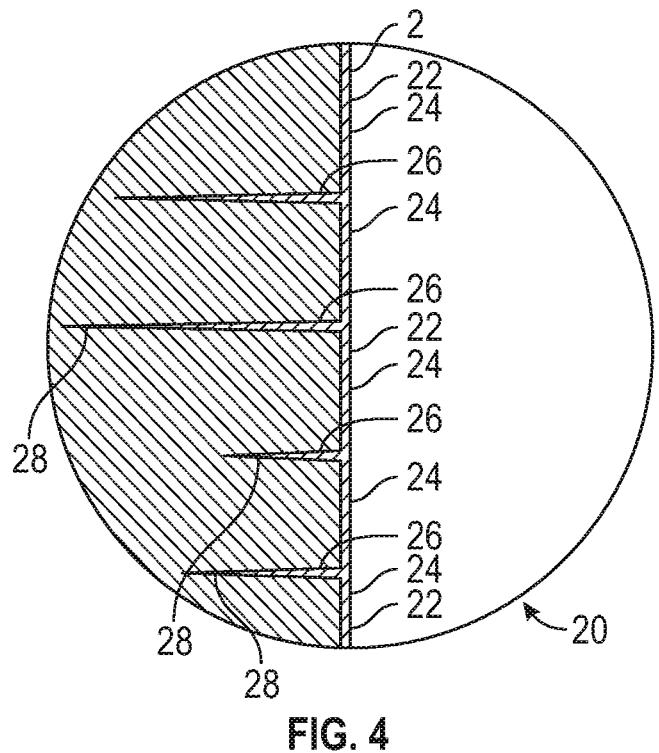
Figure 5:
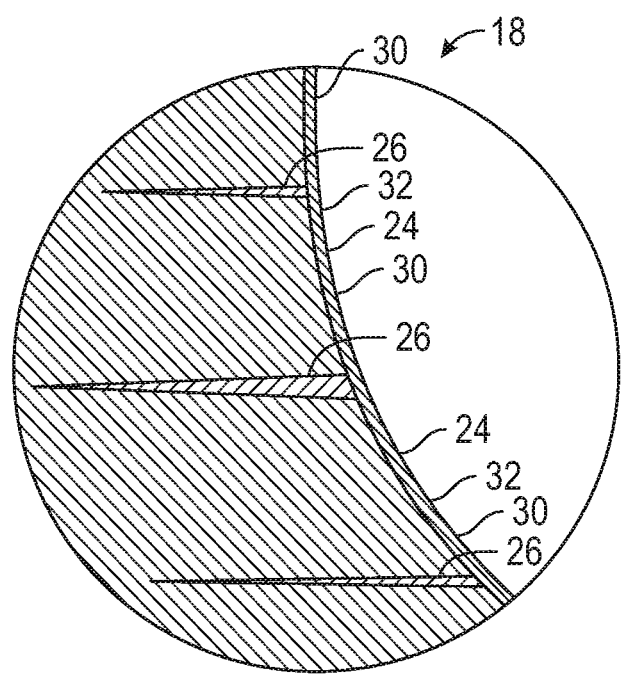

FIG. 1 is a flowchart depicting a method of manufacturing a mold assembly according to the principles of the present disclosure, FIG. 2 is a view of a mold assembly half for manufacturing an article using a plastic injection molding process according to the principles of the present disclosure, FIG. 3 is an end view of a mold assembly for manufacturing an article using a plastic injection molding process according to the principles of the present disclosure, FIG. 4 is a sectional view of a mold assembly from FIG. 3 according to the principles of the present disclosure, and FIG. 5 is a sectional view of a mold assembly from FIG. 2 according to the principles of the present disclosure.

DETAILED DESCRIPTION

The following description is merely exemplary in nature and is not intended to limit the present disclosure, application, or uses.

Referring now to FIGS. 2 and 3, a mold or mold assembly 10 for use in a blow molding process is illustrated and will now be described. The mold assembly 10 or a similar mold or mold assembly may alternatively be used in another type of manufacturing process without departing from the scope of the invention. The mold assembly 10 includes a first or upper half 12, a second or lower half 14, and a mold temperature control system 16. More particularly, the upper and lower halfs 12, 14 of the mold assembly include at least one part cavity 18 and a plurality of coolant passages 20 in communication with the mold temperature control system 16. The coolant passages 20 are arranged to provide the most consistent operating temperatures possible in the mold assembly 10. For example, since the coolant passages 20 are printed by a 3D printer, the variety of shapes, sizes, and cross sections of the coolant passages 20 that can be built is much greater than coolant passages in traditionally machined molds. The flow rate of coolant through the coolant passages can be varied by altering the cross section of a particular coolant passage 20. Coolant passages 20 can even be printed to produce heat transfer effects that have not been possible in prior mold building methods.

Turning now to FIG. 4, a cross section of the surface 22 of a coolant passage 20 from the mold assembly shown in FIG. 3 is illustrated and will now be described. Being that the mold assembly is built using a 3D printing or additive process, the mold assembly is predominantly created by layers 24 that are fused together that produce some voids or vacancies 26 between the layers 24 that may not have fused together completely. The surface 22 further includes a pressurized and cured sealant 28 that extends between the layers 24 and coats the surface 22 thus providing a passage that can withstand high pressure and temperatures without yielding. In the present example, the sealant is a two-part high temperature cured epoxy. However, other types of sealants may be incorporated into the mold assembly 10 without departing from the scope of the invention.

Turning now to FIG. 5, a cross section of the surface 30 of a part cavity 18 from the mold assembly shown in FIG. 2 is illustrated and will now be described. Being that the mold assembly is built using a 3D printing or additive process, the mold assembly is predominantly created by layers 24 that are fused together that produce some voids or vacancies 26 between the layers 24 that may not have fused together completely. Furthermore, depending upon the thickness of the layers 24, some applications may require additional machining to achieve required shapes and tolerances. For example, the surface 30 is shown having been CNC machined to achieve the specified shape of the mold cavity 18. The surface 30 further includes a pressurized and cured sealant 28 that extends between the layers 24. Additionally, in some applications, once the surface 30 is sealed a layer of deposited metal 32 may be included to provide for improved wear resistance, impact strength, and surface finish.

Referring to FIG. 1, a method 100 is depicted for creating a mold or mold assembly for use in the manufacture of parts using a variety of manufacturing processes. The method 100 described therein is for creating a mold assembly for use in a plastic injection mold process. However, many other types of mold assemblies for use in many other manufacturing processes may be built using the method 100 described here. For example, mold or mold assemblies may be built for metal stamping, foaming, injection stretch blow molding, compression molding, metal casting sand core making, resin transfer molding, thermoforming, investment casting, spin casting, and blow molding without departing from the scope of the present invention.

The method 100 includes a first step 102 of making a CAD model of the surfaces of a mold assembly. The CAD model can be created by using a surface scanning mold that uses a laser measuring device to convert the surface of a solid master part model into digital surface data. Likewise, the CAD model can be created partially from a CAD model of the part. Once the CAD model of the surface of the mold is created, a second step 104 adds features to the surface data including but not limited to mold design features such as parting surfaces, coolant passages, ejection pin holes, vent holes, and injection passages thus creating a CAD model of the mold assembly.

Next, a third step 106 uses a conversion or slicing software and generates a printing path of the CAD model of the mold assembly and transfers the printing path to a 3D printer. A fourth step 108 prints a solid model of the mold assembly using a 3D printer. In some applications, the 3D printing process includes using a high temperature, high performance thermoplastic filament that produces a high strength printed part capable of high stress and high temperature manufacturing processes. Other 3D printing materials and processes intended to increase the strength and durability of the solid model of the mold assembly may be used without departing from the scope of the present invention.

A fifth step 110 removes excess material from the solid model of the mold assembly using a CNC machine or other methods of accurate machining of molding. A sixth step 112 creates a mold path from the CAD model of the mold assembly for finish machining of the mold surface to achieve exact dimensional and surface finish specifications on the mold surface. Additional machining is performed to create or improve features including coolant passage connections. A seventh step 114 seals the mold by infusing the mold with a pressurized sealant. In particular, the coolant passages are filled with a sealant and pressurized from between about 60 psi to 100 psi for 30 seconds and more preferably at least 60 seconds. After the residual sealant is removed from the coolant passages, the remaining sealant that has been infused into the voids of the coolant passage walls is cured in place. The preferred sealant is one of a high flow, high temperature two part epoxy and a flowable ceramic. However, other flowable, curable sealants may be used without departing from the scope of this invention. The seventh step 114 of sealing the surface of the mold may include electrodeposition or electroplating of metal onto the surface of the coolant passages. An eighth step 116 enhances the surface finish of the mold surface as required for particular part specifications. For example, the mold surface may be plated using electroplating followed by polishing or machining as the dimensional specification of the finished part may be required. In this manner, particular textures may also be incorporated into the surface finish of the mold by a subsequent etching or other treating of the plated mold surface.

The description of the invention is merely exemplary in nature and variations that do not depart from the gist of the invention are intended to be within the scope of the invention. Such variations are not to be regarded as a departure from the spirit and scope of the invention.

We claim:

1. A mold assembly for use in manufacturing parts, the mold assembly, comprising:
   a first mold half and a second mold half, the first mold half being formed from a first multiple layers of a thermoplastic polymer filament fused together and the second mold half being formed from a second multiple layers of a thermoplastic polymer filament fused together, the first mold half comprising at least a first mold cavity and a first coolant passage, the first mold cavity including a first mold cavity surface and the first coolant passage including a first surface, and the second mold half comprising at least a second mold cavity and a second coolant passage, the second mold cavity including a second mold cavity surface and the second coolant passage including a second surface, wherein the first multiple layers define a first plurality of voids between the layers of the first multiple layers and the second multiple layers define a second plurality of voids between the layers of the second multiple layers;
   a sealant coated on the first and second surfaces of the coolant passages and filling the plurality of voids defined between the first and second multiple layers from the first and second surfaces of the coolant passages; and
   the sealant coated on the first mold cavity surface and the second mold cavity surface and the sealant filling the first and second plurality of voids defined between the first multiple layers and second multiple layers.

2. The mold assembly of claim 1 wherein the first and second coolant passages each comprises a first cross-section and a second cross-section, and wherein the first cross-section has a different dimension and shape as the second cross-section.

3. The mold assembly of claim 1 wherein the sealant comprises one of a two-part epoxy and a flowable ceramic.

4. The mold assembly of claim 1, further comprising:
   a mold temperature control system, the mold temperature control system in fluid communication with the first and second coolant passages of the first and second mold half, and
   wherein the mold temperature control system comprises a fluid, and a pump to circulate the fluid through the mold temperature control system and the first and second coolant passages.

5. The mold assembly of claim 1 wherein the first surface of the first mold cavity and the second surface of the second mold cavity comprises a deposited metal.

6. The mold assembly of claim 5, wherein the deposited metal is polished.

7. A method of manufacturing a mold assembly, the method comprising:
   creating a first computer aided design (CAD) model of a surface of a mold assembly, and wherein the surface comprises a final shape of a molded product;
   adding a feature to the first CAD model of the surface to create a second CAD model of the mold assembly;
   converting the second CAD model to a printing path file for use by a three dimensional printer,
   using the printing path file to print a solid model of the second CAD model in multiple layers using a thermoplastic polymer filament, wherein the solid model includes:
      a first mold half and a second mold half, the first mold half being formed from a first multiple layers of a thermoplastic polymer filament fused together and the second mold half being formed from a second multiple layers of a thermoplastic polymer filament fused together, the first mold half comprising at least a first mold cavity and a first coolant passage, the first mold cavity including a first mold cavity surface and the first coolant passage including a first surface, and the second mold half comprising at least a second mold cavity and a second coolant passage, the second mold cavity including a second mold cavity surface and the second coolant passage including a second surface, wherein the first multiple layers define a first plurality of voids between the layers of the first multiple layers and the second multiple layers define a second plurality of voids between the layers of the second multiple layers;
   coating the first and second surfaces of the coolant passages with a sealant and infusing the sealant into the plurality of voids defined between the first and second multiple layers of the first and second surfaces of the coolant passages and filling the plurality of voids with the sealant; and
   coating the first mold cavity surface and the second mold cavity surface with the sealant and infusing the sealant into the first and second plurality of voids defined between the first multiple layers and second multiple layers and filling the plurality of voids with the sealant.

8. The method of claim 7 further comprising removing excess material from the solid model.

9. The method of claim 8 further comprising converting the second CAD model to a tool cutting path and machining the solid model.

10. The method of claim 9 further comprising infusing a machined surface of the solid model with the sealant.

11. The method of claim 10 wherein the feature of the first CAD model comprises at least one of a parting surface, a coolant passage, an ejection pin hole, a vent hole, and an injection passage.

12. The method of claim 11 wherein infusing the machined surface of the solid model with the sealant further comprises infusing the machined surface and the coolant passage with the sealant and pressurizing the coolant passage between about 60 PSI and 100 PSI for 30 seconds.

13. The method of claim 11 wherein infusing the machined surface of the solid model with the sealant further comprises infusing the machined surface and the coolant passage with the sealant comprising one of a two-part epoxy and a flowable ceramic and pressurizing the coolant passage between about 60 PSI and 100 PSI for 30 seconds.

14. The method of claim 13 further comprising one of electroplating, polishing, and machining the surface of the mold assembly.

15. A method of manufacturing a mold assembly, the method comprising:
creating a first computer aided design (CAD) model of a surface of a mold assembly, and wherein the surface comprises a final shape of a molded product;
adding a feature to the first CAD model of the surface to create a second CAD model of the mold assembly, and wherein the feature includes one of a parting surface, a coolant passage, an ejection pin hole, a vent hole, and an injection passage;
converting the second CAD model to a printing path file for use by a three dimensional printer, and
using the printing path file to print a solid model of the second CAD model in multiple layers using a thermoplastic polymer filament, wherein the solid model includes:
a first mold half and a second mold half, the first mold half being formed from a first multiple layers of a thermoplastic polymer filament fused together and the second mold half being formed from a second multiple layers of a thermoplastic polymer filament fused together, the first mold half comprising at least a first mold cavity and a first coolant passage, the first mold cavity including a first mold cavity surface and the first coolant passage including a first surface, and the second mold half comprising at least a second mold cavity and a second coolant passage, the second mold cavity including a second mold cavity surface and the second coolant passage including a second surface, wherein the first multiple layers define a first plurality of voids between the layers of the first multiple layers and the second multiple layers define a second plurality of voids between the layers of the first multiple layers;
coating the first and second surfaces of the coolant passages with a sealant and filling the sealant into the plurality of voids defined between the first and second multiple layers of the first and second surfaces of the coolant passages; and
coating the first mold cavity surface and the second mold cavity surface with the sealant and filling the sealant into the first and second plurality of voids defined between the first multiple layers and second multiple layers.

16. The method of claim 15 further comprising removing excess material from the solid model.

17. The method of claim 16 further comprising converting the second CAD model to a tool cutting path and machining the solid model.

18. The method of claim 17 further comprising infusing a machined surface of the solid model with the sealant.

19. The method of claim 18 wherein infusing the machined surface of the solid model with the sealant further comprises infusing the machined surface and the coolant passage with the sealant comprising one of a two-part epoxy and a flowable ceramic and pressurizing the coolant passage between about 60 PSI and 100 PSI for 30 seconds.

20. The method of claim 19 further comprising one of electroplating, polishing, and machining the surface of the mold assembly.

* * * * *